G. POLITZ.
MEANS FOR PROTECTING PIPES FROM THE INJURIOUS ACTION OF ELECTRIC CURRENTS.
APPLICATION FILED APR. 11, 1911.
1,032,295.
Patented July 9, 1912.
Fig. 1.
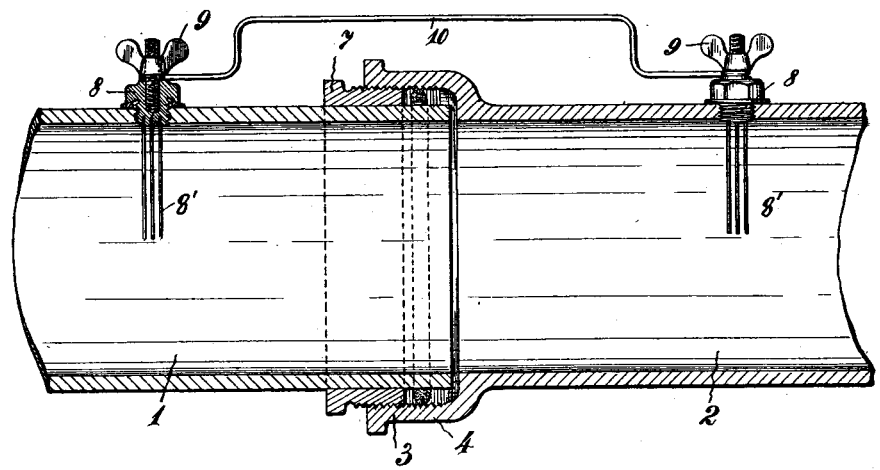
Fig. 2.
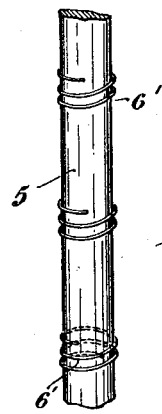
Fig. 3.
Witnesses:
Inventor:
Gustav Politz.

UNITED STATES PATENT OFFICE.

GUSTAV POLITZ, OF KATTOWITZ, GERMANY.

MEANS FOR PROTECTING PIPES FROM THE INJURIOUS ACTION OF ELECTRIC CURRENTS.

1,032,295.  Specification of Letters Patent.  Patented July 9, 1912.

Application filed April 11, 1911. Serial No. 620,488.

*To all whom it may concern:*

Be it known that I, GUSTAV POLITZ, a subject of the German Emperor, and residing at Kattowitz, Upper Silesia, Germany, have invented certain new and useful Improvements in Means for Protecting Pipes from the Injurious Action of Electric Currents, of which the following is a specification.

My invention relates to means for protecting pipes from the injurious action of electric currents conducted by them.

Piping for water, gas and the like, and also pipes built into evaporators, condensers and like vessels frequently conduct vagabond or stray currents which in time lead to the destruction of the pipes. These currents are either conducted along the pipes and are distributed on the walls of the same, or they go with the contents of the pipes, or they follow both paths.

A primary object of my invention is to render such currents non-injurious to the pipes. To this end, I electrically short-circuit the individual parts of the piping at their joints and, in addition, provide that the currents are conducted by suitable devices out of the interior of the pipes and transferred to the walls thereof. One arrangement by which these ends can be obtained is represented in the accompanying drawing, wherein:—

Figure 1 shows piping provided with my new means, and Figs. 2 and 3 show two forms of my improved packing material in its rectilinear position before being wound about the pipe.

Referring to the drawing, 1 and 2 designate two parts of pipes of a pipe line connected by a spigot and socket joint. A gasket 4 is inserted in the bell 3 of the pipe 2. According to my invention this gasket comprises a flexible, electrically insulating core 5, which forms the packing member proper, and one or more electrically conducting coils which electrically connect the parts 1 and 2 to be joined together. The coils around the core may be either a spiral 6 of wire or tape, as shown in Fig. 2, or loops 6' of wire or tape as shown in Fig. 3. The core itself may be a continuous rope or cord in the form of a ring, or it may be composed of individual pieces. The rope or cord is held in the bell 3 by a screwed ring 7, or by lead, or in other suitable manner. Further, according to my invention, in the walls of the pipes are screwed plugs 8 having projections or lugs 8' entering into the pipes. These projections 8' accordingly conduct any electricity carried by the contents of the pipe to the walls of the pipes. The plugs are provided with winged nuts 9 or the like by which an electric conductor 10 can be readily connected to them. This conductor 10 leads the current conducted to it either to earth or to the neutral feeder of a dynamo. When such connections to earth or to the neutral feeder do not exist, the conductor 10 leads the injurious current around parts which are to be specially protected, *e. g.* the pipe joint. As a rule it will suffice to provide these plugs having projections at the beginning and end of the endangered section of the pipe line, in order that it may be possible to conduct the currents to any non-injurious place by means of wires 10 attached to the plugs.

I claim:—

The combination with two pipes jointed together, of a gasket located between the two pipes, and means for retaining the gasket between the pipes, said gasket comprising a flexible core and one or more electrically conducting coils around the core for electrically connecting the pipes, said core forming the packing member proper.

In testimony whereof, I affix my signature in the presence of two witnesses.

GUSTAV POLITZ.

Witnesses:
  LINN A. WATTS,
  KLARN BENDIG.